(No Model.)
B. A. FISHER.
CAR COUPLING.
No. 285,247. Patented Sept. 18, 1883.
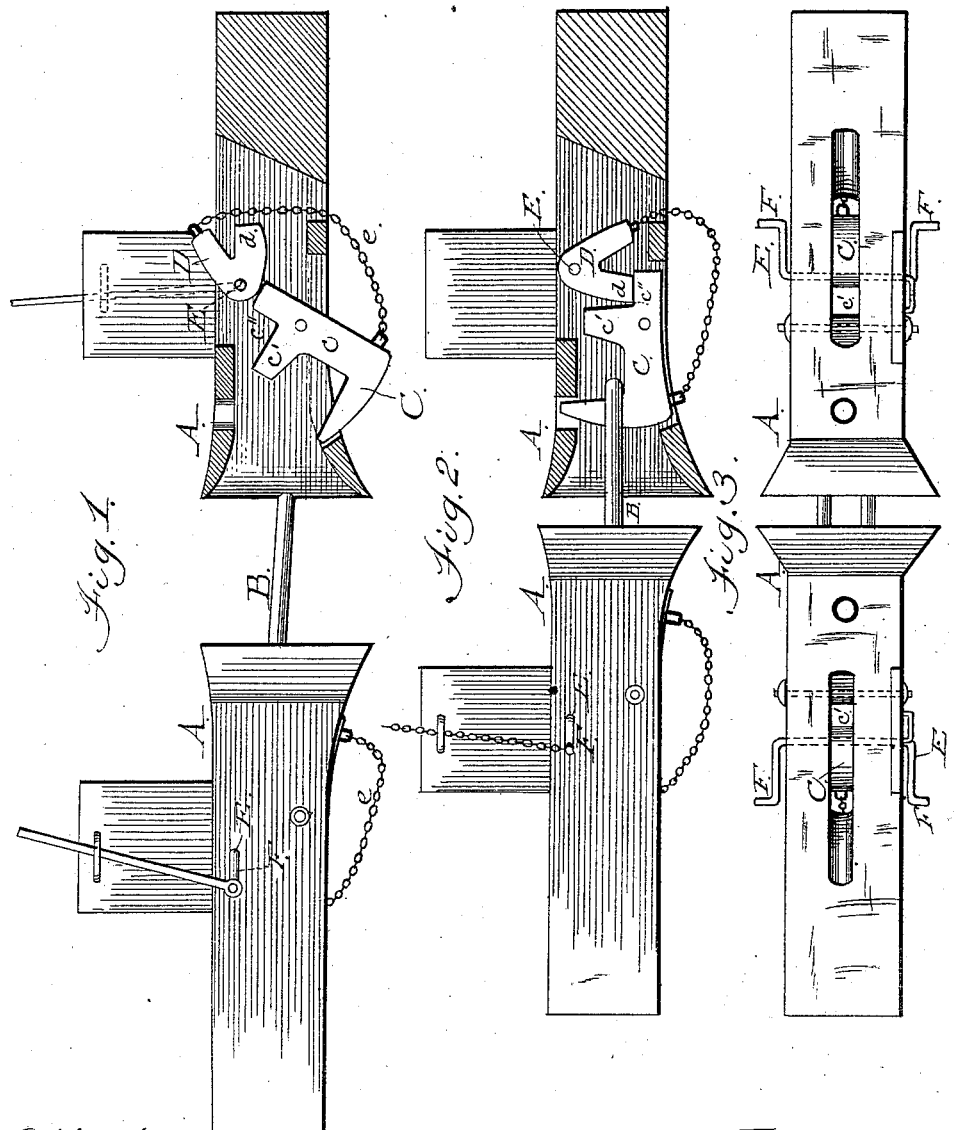
Attest:
J. Walter Fowler,
H. B. Applewhait,
Inventor;
Bevly A. Fisher
per attys
A. H. Evans & Co.

UNITED STATES PATENT OFFICE.

BEVLY A. FISHER, OF ST. JAMES, MISSOURI.

CAR-COUPLING.

SPECIFICATION forming part of Letters Patent No. 285,247, dated September 18, 1883.

Application filed June 12, 1883. (No model.)

*To all whom it may concern:*

Be it known that I, BEVLY A. FISHER, of St. James, Phelps county, and State of Missouri, have invented a new and useful Improvement in Self-Couplers for Railway-Cars, of which the following is a full, clear, and exact description, reference being had to the accompanying drawings, making a part of this specification, in which—

Figure 1 is a section of two draw-heads, showing my improvements attached. Fig. 2 is the same, showing the coupling-ring in position. Fig. 3 is a plan view of same.

My invention relates to self-couplers for railway-cars; and it consists of the combination of devices hereinafter explained and claimed.

To enable others skilled in the art to make and use my invention, I will proceed to describe the exact manner in which I have carried it out.

In the drawings, A A are the draw-heads of two cars, and B the coupling-rings. C is the coupling-pin, made as shown in Figs. 2 and 3, and pivoted at the rear of its center of gravity, so that the forward part of the pin will fall from gravity and stand normally as shown at $c$ in Fig. 1. The rear portion of the pin C is provided with the upward projection C', against which the coupling-ring B strikes as it enters the draw-head, forcing down the rear of the pin C, and causing the front to rise and catch the ring and hold it in place. In the rear of the projection C' is a flat step, $c''$, to be hereinafter explained. In order to hold the pin up to its work after it has passed through the link, as shown in Fig. 2, in the rear of the pin I pivot the tumbler D, so that its rear end, $d$, will be heavier, and it will normally hang as shown in Fig. 1; but when the link enters the draw-head and forces down the rear of the pin the forward part of the tumbler D will swing over and rest upon the step $c''$, as shown in Fig. 2, thus securing the coupling-pin C in position to hold the coupling-link and prevent the possibility of the cars becoming accidentally uncoupled. Through the tumbler D passes the lever-rod E, with its crank F, by the raising of which the tumbler is caused to swing from the step $c''$ and allow the pin C to drop out of the coupling-link, as shown in Fig. 1. In order to secure a simultaneous movement between the tumbler and the pin, they are connected by a small chain or cord, $e$, so that as the rear of the tumbler is raised by the lever the chain or cord will draw down the pin and release the link.

The cranks F F can be extended to the side of the cars, and, if desired to be connected by rods or chains, to the top of the cars, so that the coupling and uncoupling of the cars may be easily accomplished without requiring any one to pass between the cars, thus avoiding all danger to the operative.

Having thus explained my invention, what I claim, and desire to secure by Letters Patent, is—

In an automatic railway-coupler, the pivoted pin C, provided with the upward projection C' and the step $c''$, in combination with the pivoted tumbler D, lever-rod E, with its crank F, and cord $e$, all constructed to operate substantially as and for the purpose set forth.

BEVLY ALLEN FISHER.

Witnesses:
 JOHN M. SUTTON,
 ROBT. WARNER.